Patented Apr. 30, 1929.

1,710,825

UNITED STATES PATENT OFFICE.

WILLY O. HERRMANN AND WOLFRAM HAEHNEL, OF MUNICH, GERMANY, ASSIGNORS TO CONSORTIUM FUER ELEKTROCHEMISCHE INDUSTRIE, OF MUNICH, GERMANY.

PROCESS FOR THE PRODUCTION OF POLYMERIZED VINYL ACETATE.

No Drawing. Application filed November 6, 1926, Serial No. 146,841, and in Germany November 14, 1925.

The polymerization of vinyl acetate by heating in the presence of catalysts is highly exothermic and violent ebullition takes place. When working with small quantities as stated by Klatte et al. in U. S. Patent 1,241,738 it was necesary to cool the reaction vessel. But when polymerizing large quantities it is impossible to remove by external cooling the immense reaction heat which evolves with explosive character. If the vinyl acetate is mixed in the cold with the polymerizing catalyst very little reaction takes place; when this mixture is heated to its boiling point the aforesaid rapid exothermal polymerization takes place. For this reason it was not possible to carry out the polymerizing reaction of vinyl acetate at a large scale.

We have discovered a method of manufacturing polymerized vinyl acetate at any desired large scale without any danger or difficulty and with very good yields. This method consists in carrying out the polymerizing reaction in a step-wise manner under suitable conditions.

We take a small portion of the cold vinyl acetate-catalyst batch and start its polymerization by heating in a separate vessel with a reflux condenser. As soon as heat evolution starts we run cold reaction mixture into the polymerizing portion and at the same time draw from this portion a part of the reacting mixture. The heat evolved in the polymerizing vessel thus is absorbed and utilized to heat the cold incoming mixture to the reaction point. The portion of reacting mixture drawn off is allowed to complete its polymerization in a separate vessel with a reflux condenser, but such a large amount of the reaction heat has been removed from it in its first polymerizing stage that the development of excessive amounts of heat is impossible. The volatilized unchanged vinyl acetate is condensed and can be carried back into the process so that all vinyl acetate used is allowed to polymerize. A very good yield nearly theoretical is obtained. However the remaining reaction heat can be allowed to volatilize some of the unpolymerized vinyl acetate till a product of the desired properties is obtained.

As the final reaction takes some time it may be convenient to work not only in two steps as described but to add one or more other steps and to allow the reaction product to flow from the second vessel into a third one for final reaction.

By this way of step-wise working the immense reaction heat is distributed and it is then even possible to add external heating in any step for promoting the reaction.

Proceeding as above a great saving of heat is effected as well as offering a means of controlling the reaction even when working with large amounts of vinyl acetate and very good yields are obtained.

Example I.

A cold mixture of vinyl acetate containing 1% benzoyl peroxide is first prepared, 500 grams of this are heated in a 1 liter vessel with reflux condenser till polymerization begins as evidenced by bubbling and a heat development. When this point is reached a stream of cold reaction mixture is allowed to run in at such a rate that the temperature remains at about 70° C.; at the same time an about equal amount of the reacting, partially polymerized mixture is allowed to flow from the reaction vesel to a finishing vesel provided with a reflux condenser. The reaction is allowed to go to completion in the latter vessel and the product utilized as desired.

Other catalysts with or without water, as mentioned by Herrmann and Baum in U. S. Patent 1,586,803 can also be used and the reaction may be carried out in the presence of organic solvents.

Example II.

A cold mixture of vinyl acetate containing 1% benzoyl peroxide is prepared and the reaction started with 500 grams as described in Example I. When the reaction of the vinyl acetate has begun a mixture of equal parts of cold vinyl acetate-catalyst and acetone is allowed to run in at such a rate that the boiling of the reaction mixture is maintained. When the reaction has finished a viscous solution of polymerized vinyl acetate in acetone is obtained. This may be directly used for instance for lacquer purposes.

The polymerized vinyl acetate is insoluble in alcohols like ethyl alcohol, propanol, butanol, in ethers, aromatic hydrocarbons like benzene, toluene as stated in Klatte et al. in U. S. Patent 1,241,738 where alcohol and ether are characterized and used as precipitating agents for polymerized vinyl acetate.

We have found, however, that if the reaction is allowed to "finish" in an alcohol, especially ethyl alcohol, benzene or similar liquid or if the polymerizing reaction is carried out in the presence of one of these liquids the polymer will be formed and obtained in solution. Thus the finishing vessel of Example I may contain alcohol or a second finishing vessel containing the liquid may be used. The reacting mixture being poured into the liquid at same point short of complete polymerization while the polymer-vinyl acetate mixture is still miscible with the liquid chosen.

The polymerized vinyl acetate solution in ethyl alcohol or benzene and the like can be easily prepared by a modification of the process of Example I as shown by the following.

Example III.

A mixture of cold vinyl acetate containing 1% benzoyl peroxide is prepared. 500 grams of this are heated in a 1 liter vessel till polymerization begins. Then a stream of cold reaction mixture is allowed to run at such a way as shown in Example I. Part of the reacting mixture is allowed continuously to flow to a finishing vessel into which at the same time ethyl alcohol is allowed continuously to flow in at such a rate that the polymerizing reaction is maintained. In this example two thirds of the weight of the vinyl acetate introduced were used of alcohol; that is 40 parts of alcohol to 60 parts of vinyl acetate and a 60 percent solution of polymerized vinyl acetate in alcohol is obtained. This solution may be directly used for instance for lacquer purposes or the like.

In the same manner solutions of polymerized vinyl acetate in other liquids like ether and especially aromatic carbohydrates like benzene and toluene may be manufactured.

Finally we have found that it is possible to influence the polymerizing reaction by addition of compounds which for themselves have no catalytic influence but modify the properties of the polymerized vinyl acetate by softening the product or lowering its melting point as will be noted by comparison of the products of Examples IV and V below. Especially apt for this purpose is acetaldehyde which is the tautomer to vinyl alcohol and its derivatives like paraldehyde, metaldehyde, crotonic aldehyde and so on.

Example IV.

Vinyl acetate which was purified by distillation over sodium was mixed with 1% benzoyl peroxide and polymerized in the presence of 96 percent ethyl alcohol as shown in Example III. By evaporation of the alcoholic solution a glass-like hard polymer product was obtained which was infusible even at 160° C.

Example V.

The same purified vinyl acetate as used in Example IV was mixed with 3 percent acetaldehyde and 1 percent benzoyl peroxide and polymerized in the presence of 96 percent ethyl alcohol as shown in Example III. By evaporation of the alcoholic solution a yellowish product was obtained with a melting point of about 100° C.

These polymers of vinyl acetate have a variety of uses and may be used for all purposes and in the same way as stated by Klatte et al. U. S. Patent 1,241,738 and Herrmann et al. U. S. Patent 1,586,803. The free polymers may be obtained by evaporation of the solvent and used as described in the above patents either as plastics or by solution in the same or different solvent. The use as coating compounds or lacquers, for impregnating means is very important and therefore the possiblity of directly obtaining solutions of the polymer in alcohol, benzene, toluene and the like according to this process is of very high technical importance.

What we claim is:

1. Process for the production of polymerized vinyl acetate which comprises heating a body of vinyl acetate in the presence of a polymerized catalyst till the reaction starts and then adding a further quantity of cold vinyl acetate-catalyst mixture to said warm reacting body.

2. Process for the production of polymerized vinyl acetate which comprises heating a body of the vinyl acetate in the presence of a polymerizing catalyst till the reaction starts and then continuously adding a further quantity of cold vinyl acetate-catalyst mixture to said warm reacting body while simultaneously withdrawing an equivalent portion of said warm reaction mixture and allowing the polymerization to continue in a separate vessel.

3. Process for the production of polymerized vinyl acetate which comprises heating a body of the vinyl acetate in the presence of a polymerizing catalyst till the reaction starts and the continuously adding a further quantity of cold vinyl acetate-catalyst mixture to said warm reacting body while simultaneously withdrawing an equivalent portion of said warm reaction mixture and mixing it in a separate vessel with an organic solvent.

4. Process for the production of polymerized vinyl acetate which comprises heating a body of the vinyl acetate in the presence of a polymerizing catalyst till the reaction starts and then pouring said reacting mixture into an organic solvent and allowing the polymerization to continue therein.

5. Process for the production of polymerized vinyl acetate which comprises heating a body of the vinyl acetate in the presence of a polymerizing catalyst till the reaction starts and then continuously adding a further quantity of cold vinyl acetate-catalyst mixture together with an organic solvent to said warm reacting body while simultaneously withdrawing an equivalent portion of said warm reaction mixture and allowing the polymerization to continue in a separate vessel.

6. Process for the production of polymerized vinyl acetate which comprises heating a body of the vinyl acetate in the presence of a polymerizing catalyst till the reaction starts and then continuously adding a further quantity of cold vinyl acetate-catalyst mixture to said warm reacting body while simultaneously withdrawing an equivalent portion of said warm reaction mixture and mixing it in a separate vessel with alcohol.

7. Process for the production of polymerized vinyl acetate which comprises heating a body of the vinyl acetate in the presence of a polymerizing catalyst till the reaction starts and then pouring said reaction mixture into alcohol and allowing the polymerization to continue therein.

8. Process for the production of polymerized vinyl acetate which comprises heating a body of the vinyl acetate in the presence of a polymerizing catalyst till the reaction starts and then continuously adding a further quantity of cold vinyl acetate-catalyst mixture together with alcohol to said warm reacting body while simultaneously withdrawing an equivalent portion of said warm reaction mixture and allowing the polymerization to continue in a separate vessel.

9. Process for the production of polymerized vinyl acetate which comprises heating a body of the vinyl acetate containing small amounts of aldehyde in the presence of a polymerizing catalyst till the reaction starts and then adding a further quantity of cold vinyl acetate-catalyst mixture to said warm reacting body.

10. Process for the production of polymerized vinyl acetate which comprises heating a body of the vinyl acetate containing small amounts of acetaldehyde in the presence of a polymerizing catalyst till the reaction starts and then adding a further quantity of cold vinyl acetate-catalyst mixture to said warm reacting body.

11. As a new material a polymerized vinyl acetate being soluble in alcohols.

12. As a new material a polymerized vinyl acetate being soluble in ethyl alcohol.

13. As a new material a solution of polymerized vinyl acetate in alcohols.

14. As a new lacquer a solution of polymerized vinyl acetate in ethyl alcohol.

15. As a new lacquer a lacquer mixture containing polymerized vinyl acetate being soluble in ethyl alcohol.

16. A polymerized vinyl acetate prepared by polymerizing vinyl acetate in an alcoholic medium.

17. A polymerized vinyl acetate prepared by polymerizing vinyl acetate in ethyl alcohol.

18. A new composition of matter comprising ethyl alcohol with polymerized vinyl acetate dissolved therein.

19. A new composition of matter comprising ethyl alcohol with polymerized vinyl acetate dissolved therein prepared by polymerizing vinyl acetate in said alcohol.

WILLY O. HERRMANN.
WOLFRAM HAEHNEL.

CERTIFICATE OF CORRECTION.

Patent No. 1,710,825.  Granted April 30, 1929, to

WILLY O. HERRMANN ET AL.

It is hereby certified that error appears in the printed specification of the above numbered patent requiring correction as follows: Page 2, line 101, claim 1, for the word "polymerized" read "polymerizing"; and that the said Letters Patent should be read with this correction therein that the same may conform to the record of the case in the Patent Office.

Signed and sealed this 11th day of June, A. D. 1929.

M. J. Moore,

CERTIFICATE OF CORRECTION.

Patent No. 1,710,825.　　　　　　　　　　Granted April 30, 1929, to

WILLY O. HERRMANN ET AL.

It is hereby certified that error appears in the printed specification of the above numbered patent requiring correction as follows: Page 2, line 101, claim 1, for the word "polymerized" read "polymerizing"; and that the said Letters Patent should be read with this correction therein that the same may conform to the record of the case in the Patent Office.

Signed and sealed this 11th day of June, A. D. 1929.

M. J. Moore,